United States Patent [19]
Henthorn et al.

[11] 3,764,715
[45] Oct. 9, 1973

[54] METHOD OF SIMULTANEOUSLY EXTRUDING AND COATING A READY-TO-EAT CEREAL

[75] Inventors: Larry J. Henthorn, Crystal Lake; Frank R. Kings, Barrington, both of Ill.

[73] Assignee: The Quaker Oats Company, Chicago, Ill.

[22] Filed: Feb. 4, 1972

[21] Appl. No.: 223,530

[52] U.S. Cl.................... 426/273, 426/302, 426/283
[51] Int. Cl................................................ A23l 1/10
[58] Field of Search.......................................... 99/83

[56] References Cited
UNITED STATES PATENTS
2,868,647    1/1959    Vallink .................................. 99/83
3,184,316    6/1965    Dean et al. ........................... 99/83
3,450,538    6/1969    McKown et al. ..................... 99/81
3,451,946    11/1970   Johnston.............................. 425/199
3,615,675    10/1971   Wisdom et al......................... 99/83

Primary Examiner—Raymond N. Jones
Attorney—Donnie Rudd et al.

[57]    ABSTRACT

A method of producing a coated ready-to-eat cereal product is disclosed comprising producing a center filled cereal and drying the center filled cereal product until the syrupy center filling is brought through the surface of the cereal to form a dried coating thereon.

2 Claims, 8 Drawing Figures

PATENTED OCT 9 1973          3,764,715

METHOD OF SIMULTANEOUSLY EXTRUDING AND COATING A READY-TO-EAT CEREAL

BACKGROUND OF THE INVENTION

1. Field of the Invention

This invention relates to a method for producing a coated ready-to-eat cereal product.

2. Description of the Prior Art

The coating of cereal products is desirable in order to add thereto flavoring ingredients, such as sugar, or nutritional ingredients, such as vitamins. Conventionally, cereal products have been coated by tumbling in a drum and adding the coating thereto, or by some type of spraying of the coating material in conjunction with a tumbling operation. After coating, it has been conventional to dry the coated material to the desired packaging levels. No one has yet discovered a process for coating a cereal product wherein the exact amount of coating for each particle can be carefully determined, and wherein the product does not need excessive tumbling to insure uniformity of the coating.

Several methods are known for the center filling of cereal products. Among these are the processes described in U.S. Pat. No. 3,480,445 to Slaybaugh, and U.S. Pat. No. 3,615,675 to Wisdom, et al. None of these processes, however, have shown the center filling of cereal products for the express purpose of coating the products. Likewise, nowhere in the prior art has there been shown an effective and economically feasible process for the simultaneous coating and extrusion of ready-to-eat cereals. The process of this invention is the first known process for incorporating the center filling material directly into the cereal product at the extruder die. It is also the first known process for overcoming the aforementioned handicaps of the prior art.

SUMMARY OF THE INVENTION

It is an object of this invention to provide a new and novel process for the simultaneous coating and extrusion of ready-to-eat cereal products.

It is another object of this invention to provide a new process for coating cereal products in which the precise amount of coating for each product particle can be accurately determined.

It is a further object of this invention to provide a process for coating ready-to-eat cereal products in which an excessive tumbling operation is not necessary in order to achieve a uniform coating.

The objects of this invention are accomplished by a method of producing a coated ready-to-eat cereal product comprising the steps:

A. extruding under puffing conditions a hot cooked cereal dough through a first die thereby forming an expanded cereal extrudate;

B. simultaneously extruding a syrup-like liquid through a second die, said second die being positioned within the orifice of the first die in such a manner that the extrudate from the first die completely surrounds the extrudate from the second die and in such a manner that the direction of flow of the second extrudate is the same as the direction of flow of the first extrudate, said syrup-like liquid being heated as it is being extruded within the first die extrudate;

C. cutting the resulting extrudate into segments in the moments in which the puffed cereal extrudate is in a plastic, adhesive condition, said cutting of the resulting extrudate also sealing the ends of the segments thereby encapturing the syrup-like liquid totally within the puffed cereal extrudate;

D. forcing the syrup-like liquid through the puffed cereal extrudate by heating the cut segments, said syrup-like liquid substantially evacuating the center of the puffed cereal extrudate and leaving it substantially hollow; and E. drying the cut segments by further heating them, said drying forcing the syrup-like liquid to the outside of the puffed cereal extrudate to form a coating thereon.

Preferably, the syrup-like liquid used in this invention for center filling and subsequent coating comprises from about 7½ to about 9 parts by weight sugar solids and from about 1 to about 2½ parts by weight water.

In producing the new and novel coated cereal product of this invention, we first extrude simultaneously a syrupy filling surrounded by a hot plastic cereal dough. The dough is then crimped at the ends and cut to form a pillow-like cereal particle having a syrupy interior. This particle is then dried to an extent sufficient to bring the syrupy interior to the exterior of the cereal product and dry it as a coating thereon. Usually a temperature of about 315°F. to 350°F. is sufficiently high to produce the required drying and glazing when left for a time sufficient to reduce the moisture in the final product to a level of about 2 to 3 percent. We have found that drying for a period of from 40 to 50 seconds at 315°F. to produce a final moisture content of 3 percent, makes a very acceptable product.

BRIEF DESCRIPTION OF THE DRAWING

This invention may be more fully described but is not limited by the enclosed drawings in which I have used:

In the drawings, I have used the numeral 11 to indicate the discharge end portion of a conventional cereal extruder. The extruder has heated steam jackets 12 to supply heating and/or horizontally cooling in the extruder section. The extruder has a rotating screw conveyor 13 therein to force the hot, plastic cereal material therethrough. The material is forced through screen pack 14 and breaker plate 15 into horizontal pipe 16 which may or may not be heated or cooled in jacket 17. The cereal material then passes into vertical pipe 18 while still in the plastic state. Next, the cereal material passes into extruder head 19, a full description of which may be seen in U.S. Pat. No. 3,541,946 issued to Ronald M. Johnson. At this point a syrupy material is injected in supply line 20 for center filling in the cereal material. Looking at FIG. 4, the center filled material 21, passes in the center of the extruder head 19 and the plastic cereal material 22 surrounds it in a circular design. The materials both exit at the die 23 and expand when the pressure is released. At this point the cereal material 22 is still in a plastic state. The nature of the material at this point is a syrupy liquid enclosed by a plastic cereal material. This enclosed tube of material then passes between anvil roll 24 and roll 25 which has radial extending knives 26 thereon. The material is crimped and cut in the form of a pillow shape center filled material 27. This material then falls on conveyor belt 28 and passes along the conveyor belt through oven 29 until it is dried and coated and ready for packaging. FIG. 6 illustrates a typical cereal particle 27 as it leaves the cutting and crimping section. The product is still a plastic material 22 with a syrupy center filled 21. Movement of the center filling material into the cereal begins due to the moisture difference between the syrup and the cereal piece. As heating begins in oven 29, the syrupy material is fully absorbed by the cereal material and the cereal material is dried. At this point, the syrupy material moves through the body of the cereal material and evacuates the center of the center filled piece as shown in FIG. 7. After further drying in oven 29, the cereal material 22 is thoroughly impregnated with the syrupy center fill and coated thereon with a glazed dried sugary coating 30 giving the desired coated product.

DESCRIPTION OF THE PREFERRED EMBODIMENTS

Figure 1:
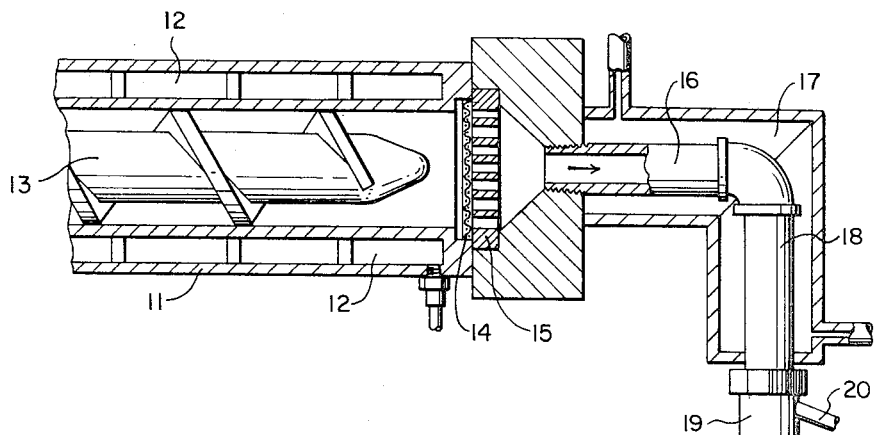
FIG. 1 to illustrate a cross-sectional view of the extrusion apparatus of this invention along with the drying step.
Figure 2:
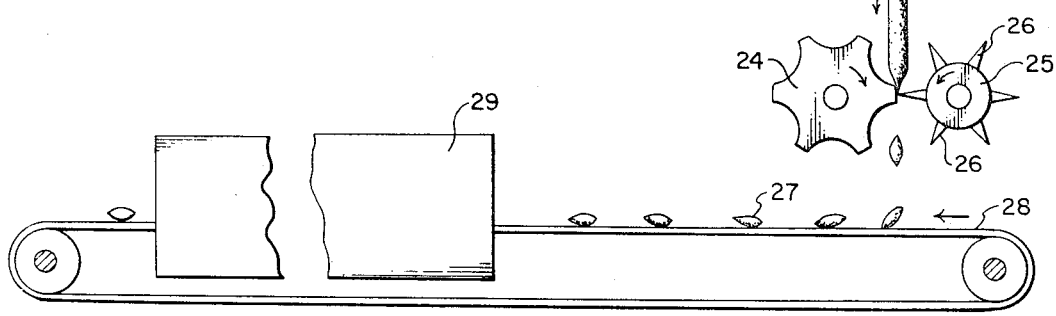
FIG. 2 and FIG. 3 show the cutting of the filled cereal product after it leaves the extruder.
Figure 2:
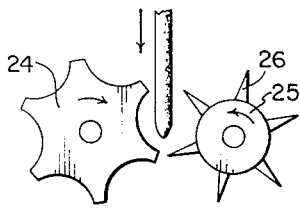
Figure 3:
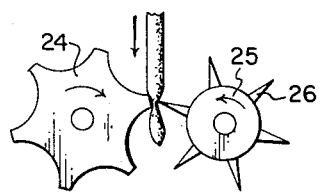
Figure 4:
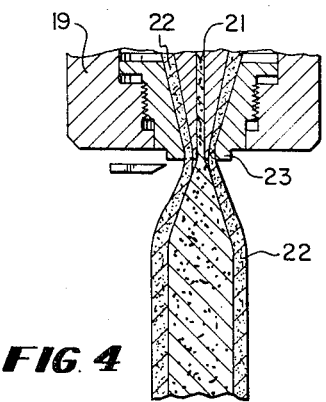
FIG. 4 shows the extrusion head apparatus and die thereon.
Figure 5:
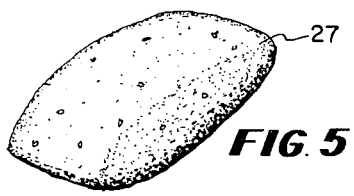
FIG. 5 shows the cut and sealed cereal product.
Figure 6:
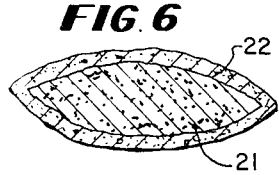
FIG. 6 is a cross-sectional view of the filled cereal product.
Figure 7:
FIG. 7 is a cross-sectional view showing partial drying of the center filled product and partial evacuation of the interior of the filled product.
Figure 8:
FIG. 8 illustrates the dried finished product with a coating thereon and with the center filling material substantially evacuated from the center of the product.

The following example constitutes a preferred embodiment of this invention although the invention is not limited thereto:

EXAMPLE

A cereal mixture was prepared by mixing 80 parts by weight corn flour, 10 parts by weight oat flour, 5 parts by weight sugar, 5 parts by weight rice flour and 2 parts by weight flavoring ingredients. This mixture was then admixed with water to bring the moisture to about 16 to 20 percent by weight. A filling was prepared by admixing 16 parts by weight water, 36 parts by weight granulated sugar, 36 parts by weight powdered sugar, and a minor portion of flavoring ingredients. The mixtures were then properly extruded in the previously described extrusion equipment and toasted for from 40 to 50 seconds at 315°F. The resulting product was a pleasant tasting, uniformly coated, ready-to-eat cereal.

This new and novel process provides the first known economical method for the simultaneously coating and extrusion of ready-to-eat cereal products.

Having fully described this new and unique invention, we claim:

1. A method of producing a coated ready-to-eat cereal product comprising the steps:
   A. extruding under puffing conditions a hot cooked cereal dough through a first die thereby forming an expanded cereal extrudate;
   B. simultaneously extruding a syrup-like liquid through a second die, said second die being positioned within the orifice of the first die in such a manner that the extrudate from the first die completely surrounds the extrudate from the second die and in such a manner that the direction of flow of the second extrudate is the same as the direction of flow of the first extrudate, said syrup-like liquid being heated as it is being extruded within the first die extrudate;
   C. cutting the resulting extrudate into segments in the moments in which the puffed cereal extrudate is in a plastic, adhesive condition, said cutting of the resulting extrudate also sealing the ends of the segments thereby encapturing the syrup-like liquid totally within the puffed cereal extrudate;
   D. forcing the syrup-like liquid through the puffed cereal extrudate by heating the cut segments, said syrup-like liquid substantially evacuating the center of the puffed cereal extrudate and leaving it substantially hollow; and
   E. drying the cut segments by further heating them, said drying forcing the syrup-like liquid to the outside of the puffed cereal extrudate to form a coating thereon.

2. A process as in claim 1 in which the syrup-like liquid comprises from about 7½ to about 9 parts by weight sugar solids in from about 1 to about 2½ parts by weight water.

* * * * *

UNITED STATES PATENT OFFICE
CERTIFICATE OF CORRECTION

Patent No. 3,764,715                    Dated  October 9, 1973

Inventor(s)  Larry J. Henthorn and Frank R. Kincs

It is certified that error appears in the above-identified patent and that said Letters Patent are hereby corrected as shown below:

In the list of inventors on the cover sheet "Frank R. Kings" should read --Frank R. Kincs--.

Signed and sealed this 12th day of February 1974.

(SEAL)
Attest:

EDWARD M. FLETCHER, JR.
Attesting Ojficer

C. MARSHALL DANN
Commissioner of Patents